United States Patent
Shao et al.

(10) Patent No.: US 12,431,014 B2
(45) Date of Patent: Sep. 30, 2025

(54) METHOD AND SYSTEM FOR ACTIVE CONTROL OF ROAD NETWORK TRAFFIC CONGESTION

(71) Applicant: Tongji University, Shanghai (CN)

(72) Inventors: Minhua Shao, Shanghai (CN); Yuncheng Zeng, Shanghai (CN); Lijun Sun, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 288 days.

(21) Appl. No.: 18/142,982

(22) Filed: May 3, 2023

(65) Prior Publication Data

US 2023/0360522 A1    Nov. 9, 2023

(30) Foreign Application Priority Data

May 7, 2022    (CN) .......................... 202210494373.3

(51) Int. Cl.
*G08G 1/01*      (2006.01)
*G06N 3/0464*    (2023.01)

(52) U.S. Cl.
CPC ......... *G08G 1/0145* (2013.01); *G06N 3/0464* (2023.01)

(58) Field of Classification Search
CPC ........................ G08G 1/0145; G06N 3/0464
USPC ........................................................ 701/117
See application file for complete search history.

(56) References Cited

U.S. PATENT DOCUMENTS

| | | | |
|---|---|---|---|
| 6,177,885 B1* | 1/2001 | Weil | G08G 1/0104 340/937 |
| 8,405,521 B2* | 3/2013 | Fujiwara | G08G 1/0112 340/901 |
| 8,930,123 B2* | 1/2015 | Srivastava | G08G 1/0112 701/119 |
| 9,286,793 B2* | 3/2016 | Pan | G08G 1/0112 |
| 10,168,176 B2* | 1/2019 | Saito | G08G 1/0969 |
| 10,339,800 B2* | 7/2019 | Shen | G08G 1/0133 |
| 10,775,186 B2* | 9/2020 | Sharma | G08G 1/096838 |
| 11,594,126 B2* | 2/2023 | Guo | G08G 1/0133 |
| 2014/0114885 A1* | 4/2014 | Han | G08G 1/0133 706/20 |
| 2018/0252548 A1* | 9/2018 | Saito | G08G 1/09626 |
| 2018/0261082 A1* | 9/2018 | Shen | G08G 1/0116 |
| 2019/0204100 A1* | 7/2019 | Sharma | G08G 1/012 |
| 2019/0279247 A1* | 9/2019 | Finken | H04L 9/0637 |

(Continued)

*Primary Examiner* — Luis A Martinez Borrero

(57) ABSTRACT

A method and system for active control of road network traffic congestion, and in particular, to the technical field of traffic congestion control includes: constructing a directed graph according to the positions of detectors in a road network; determining a free-flow reachability matrix of the directed graph and a plurality of neighborhood matrices with different orders according to a free-flow vehicle speed between cross-sections where the detectors are located and the directed graph; calculating a convolution operator of the directed graph within a set time period; inputting the convolution operator of the directed graph within the set time period into a long short-term memory neural network model to obtain a traffic state of each cross-section at each moment within a predicted time period; and determining whether a control method for each cross-section is single-point control or circle layer control.

8 Claims, 6 Drawing Sheets

(56) References Cited

U.S. PATENT DOCUMENTS

| | | | | |
|---|---|---|---|---|
| 2020/0111348 A1* | 4/2020 | Gentile | ............... | G08G 1/0112 |
| 2021/0407284 A1* | 12/2021 | Li | ........................ | G08G 1/0129 |
| 2022/0068123 A1* | 3/2022 | Guo | ..................... | G08G 1/0112 |
| 2023/0222454 A1* | 7/2023 | Cella | ........................ | G06N 7/01 |
| | | | | 705/28 |

\* cited by examiner

METHOD AND SYSTEM FOR ACTIVE CONTROL OF ROAD NETWORK TRAFFIC CONGESTION

CROSS REFERENCE TO RELATED APPLICATION AND CLAIM OF PRIORITY

This patent application claims the benefit and priority of Chinese Patent Application No. 202210494373.3, filed with the China National Intellectual Property Administration on May 7, 2022, the disclosure of which is incorporated by reference herein in its entirety as part of the present application.

TECHNICAL FIELD

The present disclosure relates to the technical field of traffic congestion control, and in particular, to a method and system for active control of road network traffic congestion.

BACKGROUND

With the continuous development of cities, the demand for transportation increases greatly, but long-term and large-scale traffic congestion becomes more frequent. Traffic congestion is no longer only in the form of a single node and a single road section, and the trend of congestion spreading in area time and space is very prominent. How to scientifically and effectively control traffic congestion has become a difficult problem for traffic control departments. A road traffic state has periodicity and spatial-temporal correlation, and a traffic condition of a road section may spread to surrounding road sections along the road structure, leading to a change in the traffic condition of surrounding road sections in a certain spatial range. In the prior art, although some measures have been actively taken to manage and control road traffic, most of these measures are single-point control measures, making it difficult to play an effective role. Therefore, there is a need to explore a new road control method to effectively improve traffic efficiency.

SUMMARY

An objective of the present disclosure is to provide a method and system for active control of road network traffic congestion, which can effectively improve traffic efficiency and reduce congestion.

To achieve the above objective, the present disclosure provides the following technical solutions:

A method for active control of road network traffic congestion includes:
  acquiring positions of detectors in a road network and a traffic state of a cross-section where each of the detectors is located at each moment within a set time period, where the traffic state includes a vehicle speed and traffic flow;
  constructing a directed graph according to the positions of the detectors in the road network, where nodes in the directed graph are cross-sections where the detectors are located in the road network, and edges in the directed graph are road sections between the cross-sections where the detectors are located;
  determining a free-flow reachability matrix of the directed graph and a plurality of neighborhood matrices with different orders according to a free-flow vehicle speed between the cross-sections where the detectors are located and the directed graph, where when the order is k, the neighborhood matrices indicate whether a vehicle reaches a $j^{th}$ detector from an $i^{th}$ detector after passing across k road sections, and the free-flow reachability matrix indicates whether the vehicle reaches the $j^{th}$ detector from the $i^{th}$ detector at the free-flow vehicle speed within a set time;
  calculating a convolution operator of the directed graph at each moment within the set time period according to the neighborhood matrices of all the orders, the free-flow reachability matrix, and the traffic state of the cross-section where each of the detectors is located at each moment within the set time period;
  inputting the convolution operator of the directed graph at each moment within the set time period into a long short-term memory neural network model to obtain a traffic state of a cross-section where each of the detectors is located at each moment in a predicted time period; and
  determining, according to the traffic state of the cross-section where each of the detectors is located at each moment within the set time period and the traffic state of the cross-section where the detector is located at each moment in the predicted time period, a method for traffic flow control at the cross-section where the detector is located, where the method for traffic flow control includes circle layer control or single-point control; and the circle layer control is to control, according to a distance between the cross-section where the detector is located and a congestion source, the traffic flow of the cross-section where the detector is located.

Optionally, the determining, according to the traffic state of the cross-section where each of the detectors is located at each moment within the set time period and the traffic state of the cross-section where the detector is located at each moment in the predicted time period, a method for traffic flow control at the cross-section where the detector is located specifically includes:
  determining, according to the traffic state of the cross-section where each of the detectors is located at each moment within the set time period and the traffic state of the cross-section where the detector is located at each moment in the predicted time period, whether the cross-section where the detector is located is a congestion source or single-point congestion;
  controlling, when the cross-section where the detector is located is single-point congestion, the traffic flow of the cross-section by using a control method for single-point control; and
  controlling, when the cross-section where the detector is located is a congestion source, the cross-section where the detector is located by using a control method for circle layer control, and determining, in real time, whether to stop circle layer control according to first congestion duration, second congestion duration, a vehicle speed within the first congestion duration before control and a vehicle speed within the first congestion duration after the control, where the first congestion duration is congestion duration before control; and the second congestion duration is congestion duration after the control.

Optionally, the determining a free-flow reachability matrix of the directed graph and a plurality of neighborhood matrices with different orders according to a free-flow vehicle speed between the cross-sections where the detectors are located and the directed graph specifically includes:

determining a shortest distance matrix of the directed graph and the plurality of neighborhood matrices with different orders according to the directed graph; and calculating the free-flow reachability matrix according to the shortest distance matrix of the directed graph and the free-flow vehicle speed between the cross-sections where the detectors are located.

Optionally, the calculating a convolution operator of the directed graph at each moment within the set time period according to the neighborhood matrices of all the orders, the free-flow reachability matrix, and the traffic state of the cross-section where each of the detectors is located at each moment within the set time period specifically includes:

calculating, for any order, a convolution operator of the directed graph corresponding to the order at each moment within the set time period according to the neighborhood matrices of the order, the free-flow reachability matrix, and the traffic state of the cross-section where each of the detectors is located at each moment within the set time period; and calculating the convolution operator of the directed graph at each moment within the set time period according to the convolution operators corresponding to all the orders of the directed graph at each moment within the set time period.

Optionally, the calculating a convolution operator of the directed graph corresponding to the order at each moment within the set time period according to the neighborhood matrices of the order, the free-flow reachability matrix, and the traffic state of the cross-section where each of the detectors is located at each moment within the set time period specifically includes:

calculating a convolution operator of the k-hop (k-th order) directed graph at a moment t according to formula $GC_t^k = (W_{gc\_k} \odot \tilde{A}^k \odot FFR)$, where $GC_t^k$ represents a convolution operator of the k-hop directed graph at the moment t, $W_{gc\_k}$ represents a weight matrix of a k-hop neighborhood matrix, $\tilde{A}^k$ represents a k-hop neighborhood matrix, FFR represents the free-flow reachability matrix and X represents the traffic state of the cross-section where each of the detectors is located at the moment t.

A system for active control of road network traffic congestion includes:

an acquisition module, configured to acquire positions of detectors in a road network and a traffic state of a cross-section where each of the detectors is located at each moment within a set time period, where the traffic state includes a vehicle speed and traffic flow;

a directed graph construction module, configured to construct a directed graph according to the positions of the detectors in the road network, where nodes in the directed graph are cross-sections where the detectors are located in the road network, and edges in the directed graph are road sections between the cross-sections where the detectors are located;

a parameter calculation module, configured to determine a free-flow reachability matrix of the directed graph and a plurality of neighborhood matrices with different orders according to a free-flow vehicle speed between the cross-sections where the detectors are located and the directed graph, where when the order is k, the neighborhood matrices indicate whether a vehicle reaches a $j^{th}$ detector from an $i^{th}$ detector after passing across k road sections, and the free-flow reachability matrix indicates whether the vehicle reaches the $j^{th}$ detector from the $i^{th}$ detector at the free-flow vehicle speed within a set time;

a convolution operator calculation module, configured to calculate a convolution operator of the directed graph at each moment within the set time period according to the neighborhood matrices of all the orders, the free-flow reachability matrix, and the traffic state of the cross-section where each of the detectors is located at each moment within the set time period;

a traffic state determining module, configured to input the convolution operator of the directed graph at each moment within the set time period into a long short-term memory neural network model to obtain a traffic state of a cross-section where each of the detectors is located at each moment in a predicted time period; and a control module, configured to determine, according to the traffic state of the cross-section where each of the detectors is located at each moment within the set time period and the traffic state of the cross-section where the detector is located at each moment in the predicted time period, a method for traffic flow control at the cross-section where the detector is located, where the method for traffic flow control includes circle layer control or single-point control; and the circle layer control is to control, according to a distance between the cross-section where the detector is located and a congestion source, the traffic flow of the cross-section where the detector is located.

Optionally, the control module includes:

a traffic state determining unit, configured to determine, according to the traffic state of the cross-section where each of the detectors is located at each moment within the set time period and the traffic state of the cross-section where the detector is located at each moment in the predicted time period, whether the cross-section where the detector is located is a congestion source or single-point congestion;

a single-point control unit, configured to control, when the cross-section where the detector is located is single-point congestion, the traffic flow of the cross-section by using a control method for single-point control; and a circle layer control unit, configured to control, when the cross-section where the detector is located is a congestion source, the cross-section where the detector is located by using a control method for circle layer control, and determine, in real-time, whether to stop circle layer control according to the first congestion duration, second congestion duration, a vehicle speed within the first congestion duration before control and a vehicle speed within the first congestion duration after the control, where the first congestion duration is congestion duration before control; and the second congestion duration is congestion duration after the control.

Optionally, the parameter calculation module includes:

a shortest distance matrix and neighborhood matrix calculation unit, configured to determine a shortest distance matrix of the directed graph and the plurality of neighborhood matrices with different orders according to the directed graph; and a free-flow reachability matrix calculation unit, configured to calculate the free-flow reachability matrix according to the shortest distance matrix of the directed graph and the free-flow vehicle speed between the cross-sections where the detectors are located.

Optionally, the convolution operator calculation module includes:

a unit for calculating a convolution operator of a directed graph, configured to calculate, for any order, a convolution operator of the directed graph corresponding to the order at each moment within the set time period according to the neighborhood matrices of the order, the free-flow reachability matrix and the traffic state of the cross-section where each of the detectors is located at each moment within the set time period; and a convolution operator calculation unit, configured to calculate the convolution operator of the directed graph at each moment within the set time period according to the convolution operators corresponding to all the orders of the directed graph at each moment within the set time period.

Optionally, the unit for calculating a convolution operator of a directed graph includes:

a subunit for calculating a convolution operator of a directed graph, configured to calculate a convolution operator of the k-hop directed graph at a moment t according to formula $GC_t^k = (W_{gc\_k} \odot \tilde{A}^k \odot FFR)$, where $GC_t^k$ represents a convolution operator of the k-hop directed graph at the moment t, $W_{gc\_k}$ represents a weight matrix of a k-hop neighborhood matrix, $\tilde{A}^k$ represents a k-hop neighborhood matrix, FFR represents the free-flow reachability matrix and $X_t$ represents the traffic state of the cross-section where each of the detectors is located at the moment t.

According to specific embodiments of the present disclosure, the present disclosure discloses the following technical effects: A directed graph is constructed according to positions of detectors in a road network; a free-flow reachability matrix of the directed graph and a plurality of neighborhood matrices with different orders are determined according to a free-flow vehicle speed between cross-sections where the detectors are located and the directed graph; a convolution operator of the directed graph at each moment within a set time period is calculated according to neighborhood matrices of all the orders, the free-flow reachability matrix and a traffic state of a cross-section where each of the detectors is located at each moment within the set time period; the convolution operator of the directed graph at each moment within the set time period is inputted into a long short-term memory neural network model to obtain a traffic state of the cross-section where the detector is located at each moment within a predicted time period; and a method for traffic flow control at the cross-section where the detector is located is determined according to the traffic state of the cross-section where the detector is located at each moment within the set time period and the traffic state of the cross-section where the detector is located at each moment in the predicted time period, where the method for control includes circle layer control or single-point control; and the circle layer control is to control, according to a distance between the cross-section where the detector is located and a congestion source, the traffic flow of the cross-section where the detector is located. According to the present disclosure, the method of single-point control and circle layer control is used according to the traffic state of the cross-section where the detector is located, so that road traffic efficiency can be effectively improved to reduce road congestion.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other accompanying drawings can be further derived from these accompanying drawings by a person of ordinary skill in the art without creative efforts.

DETAILED DESCRIPTION OF THE INVENTION

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

To make the above objectives, features, and advantages of the present disclosure clearer and more comprehensible, the present disclosure will be further described in detail below with reference to the accompanying drawings and the specific implementations.

Figure 1:
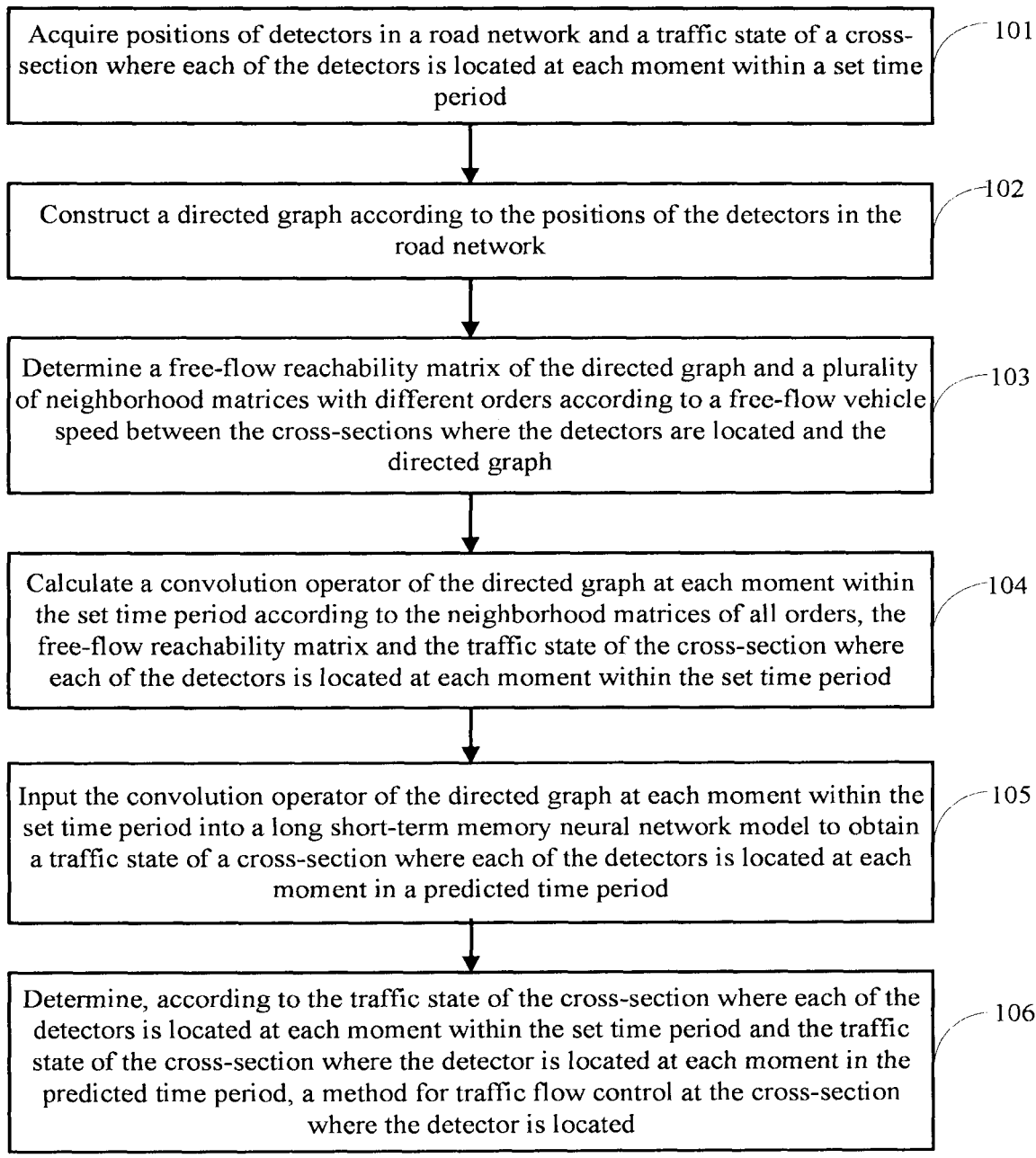
FIG. 1 is a flowchart of a method for active control of road network traffic congestion according to an embodiment of the present disclosure.

In recent years, the development of new technologies such as ramp fuzzy control and artificial neural network control has brought new ideas to the control of urban traffic congestion. In a big data environment of traffic, an artificial intelligence algorithm is used to process and analyze real-time traffic data more accurately and quickly, thereby bringing greater possibilities to implement an intelligent active traffic control technology under compound conditions such as multiple circle layers, multiple scenarios, multiple objectives, and multiple modes. On this basis, the present disclosure provides a method and system for active control of road network traffic congestion, and particularly relates to a method and system for control of urban road network traffic congestion based on a directed traffic graph convolutional long short-term memory neural network model, so as to adapt to the new characteristics of high saturation and comprehensiveness in urban traffic operation and congestion control, learn the spatial-temporal dual characteristics of road network traffic, find a spatial-temporal mode of congestion from historical data, find key road sections and congestion sources with a large range of influence in the road network, combine single-point control and multi-circle layer control, effectively and accurately predict when and where congestion occurs and respond, prevent congestion before it happens, and take active measures to prevent congestion, shorten the congestion time, and curb the spread of congestion targetedly, which implements object control and control means in a circle layer manner completely and targetedly. A control scheme strategy and a technical framework are clear and highly systematic. As shown in FIG. 1, the method specifically includes the following steps.

Step 101: Acquire the positions of detectors in a road network and a traffic state of a cross-section where each of the detectors is located at each moment within a set time period. The traffic state includes vehicle speed and traffic flow.

Step 102: Construct a directed graph according to the positions of the detectors in the road network. Nodes in the directed graph are cross-sections where the detectors are located in the road network, and edges in the directed graph are road sections between the cross-sections where the detectors are located.

Step 103: Determine a free-flow reachability matrix of the directed graph and a plurality of neighborhood matrices with different orders according to a free-flow vehicle speed between the cross-sections where the detectors are located and the directed graph. When the order is k, the neighborhood matrices indicate whether a vehicle reaches a $j^{th}$ detector from an $i^{th}$ detector after passing across k road sections, and the free-flow reachability matrix indicates whether the vehicle reaches the $j^{th}$ detector from the $i^{th}$ detector at the free-flow vehicle speed within a set time.

Step 104: Calculate a convolution operator of the directed graph at each moment within the set time period according to the neighborhood matrices of all the orders, the free-flow reachability matrix, and the traffic state of the cross-section where each of the detectors is located at each moment within the set time period.

Step 105: Input the convolution operator of the directed graph at each moment within the set time period into a long short-term memory neural network model to obtain a traffic state of a cross-section where each of the detectors is located at each moment in a predicted time period.

Step 106: Determine, according to the traffic state of the cross-section where each of the detectors is located at each moment within the set time period and the traffic state of the cross-section where the detector is located at each moment in the predicted time period, a method for traffic flow control at the cross-section where the detector is located. The method for traffic flow control includes circle layer control or single-point control, and the circle layer control is to control, according to a distance between the cross-section where the detector is located and a congestion source, the traffic flow of the cross-section where the detector is located.

In practical application, the determining, according to the traffic state of the cross-section where each of the detectors is located at each moment within the set time period and the traffic state of the cross-section where the detector is located at each moment in the predicted time period, a method for traffic flow control at the cross-section where the detector is located specifically includes:

determining, according to the traffic state of the cross-section where each of the detectors is located at each moment within the set time period and the traffic state of the cross-section where the detector is located at each moment in the predicted time period, whether the cross-section where the detector is located is a congestion source or single-point congestion;

controlling, when the cross-section where the detector is located is single-point congestion, the traffic flow of the cross-section by using a control method for single-point control; and controlling, when the cross-section where the detector is located is a congestion source, the cross-section where the detector is located by using a control method for circle layer control, and determining, in real time, whether to stop circle layer control according to first congestion duration, second congestion duration, a vehicle speed within the first congestion duration before control and a vehicle speed within the first congestion duration after the control, where the first congestion duration is congestion duration before control; and the second congestion duration is congestion duration after the control.

In practical application, the determining a free-flow reachability matrix of the directed graph and a plurality of neighborhood matrices with different orders according to a free-flow vehicle speed between the cross-sections where the detectors are located and the directed graph specifically includes:

determining a shortest distance matrix of the directed graph and the plurality of neighborhood matrices with different orders according to the directed graph; and calculating the free-flow reachability matrix according to the shortest distance matrix of the directed graph and the free-flow vehicle speed between the cross-sections where the detectors are located.

In practical application, the calculating a convolution operator of the directed graph at each moment within the set time period according to the neighborhood matrices of all the orders, the free-flow reachability matrix and the traffic state of the cross-section where each of the detectors is located at each moment within the set time period specifically includes:

calculating, for any order, a convolution operator of the directed graph corresponding to the order at each moment within the set time period according to the neighborhood matrices of the order, the free-flow reachability matrix, and the traffic state of the cross-section where each of the detectors is located at each moment within the set time period; and calculating the convolution operator of the directed graph at each moment within the set time period according to the convolution operators corresponding to all the orders of the directed graph at each moment within the set time period.

In practical application, the calculating a convolution operator of the directed graph corresponding to the order at each moment within the set time period according to the neighborhood matrices of the order, the free-flow reachability matrix and the traffic state of the cross-section where each of the detectors is located at each moment within the set time period specifically includes:

calculating a convolution operator of the k-hop directed graph at a moment t according to formula $GC_t^k = (W_{gc\_k} \odot \tilde{A}^k \odot FFR)$, where $GC_t^k$ represents a convolution operator of the k-hop directed graph at the moment t, $W_{gc\_k}$ represents a weight matrix of a k-hop neighborhood matrix, $\tilde{A}^k$ represents a k-hop neighborhood matrix, FFR represents the free-flow reachability matrix and $X_t$ represents the traffic state of the cross-section where each of the detectors is located at the moment t.

The embodiment of the present disclosure has the following technical effects:

In the method for active control of road network traffic congestion according to this embodiment, a scientific and effective circle layer spatial-temporal progressive congestion control strategy is implemented, a timely response and treatment of current congestion problems and preventive improvement of potential congestion problems can be implemented, and the road traffic efficiency can be effectively improved to reduce road congestion.

Against the above method, an embodiment of the present disclosure provides a system for active control of road network traffic congestion, including:

an acquisition module, configured to acquire positions of detectors in a road network and a traffic state of a cross-section where each of the detectors is located at each moment within a set time period, where the traffic state includes a vehicle speed and traffic flow;

a directed graph construction module, configured to construct a directed graph according to the positions of the detectors in the road network, where nodes in the directed graph are cross-sections where the detectors are located in the road network, and edges in the directed graph are road sections between the cross-sections where the detectors are located;

a parameter calculation module, configured to determine a free-flow reachability matrix of the directed graph and a plurality of neighborhood matrices with different orders according to a free-flow vehicle speed between the cross-sections where the detectors are located and the directed graph, where when the order is k, the neighborhood matrices indicate whether a vehicle reaches a $j^{th}$ detector from an $i^{th}$ detector after passing across k road sections, and the free-flow reachability matrix indicates whether the vehicle reaches the $j^{th}$ detector from the $i^{th}$ detector at the free-flow vehicle speed within a set time;

a convolution operator calculation module, configured to calculate a convolution operator of the directed graph at each moment within the set time period according to the neighborhood matrices of all the orders, the free-flow reachability matrix and the traffic state of the cross-section where each of the detectors is located at each moment within the set time period;

a traffic state determining module, configured to input the convolution operator of the directed graph at each moment within the set time period into a long short-term memory neural network model to obtain a traffic state of a cross-section where each of the detectors is located at each moment in a predicted time period; and a control module, configured to determine, according to the traffic state of the cross-section where each of the detectors is located at each moment within the set time period and the traffic state of the cross-section where the detector is located at each moment in the predicted time period, a method for traffic flow control at the cross-section where the detector is located, where the method for traffic flow control includes circle layer control or single-point control; and the circle layer control is to control, according to a distance between the cross-section where the detector is located and a congestion source, the traffic flow of the cross-section where the detector is located.

In practical application, the control module includes:

a traffic state determining unit, configured to determine, according to the traffic state of the cross-section where each of the detectors is located at each moment within the set time period and the traffic state of the cross-section where the detector is located at each moment in the predicted time period, whether the cross-section where the detector is located is a congestion source or single-point congestion;

a single-point control unit, configured to control, when the cross-section where the detector is located is single-point congestion, the traffic flow of the cross-section by using a control method for single-point control; and a circle layer control unit, configured to control, when the cross-section where the detector is located is a congestion source, the cross-section where the detector is located by using a control method for circle layer control, and determine, in real time, whether to stop circle layer control according to the first congestion duration, second congestion duration, a vehicle speed within the first congestion duration before control and a vehicle speed within the first congestion duration after the control, where the first congestion duration is congestion duration before control; and the second congestion duration is congestion duration after the control.

In practical application, the parameter calculation module includes:

a shortest distance matrix and neighborhood matrix calculation unit, configured to determine a shortest distance matrix of the directed graph and the plurality of neighborhood matrices with different orders according to the directed graph; and a free-flow reachability matrix calculation unit, configured to calculate the free-flow reachability matrix according to the shortest distance matrix of the directed graph and the free-flow vehicle speed between the cross-sections where the detectors are located.

In practical application, the convolution operator calculation module includes:

a unit for calculating a convolution operator of a directed graph, configured to calculate, for any order, a convolution operator of the directed graph corresponding to the order at each moment within the set time period according to the neighborhood matrices of the order, the free-flow reachability matrix and the traffic state of the cross-section where each of the detectors is located at each moment within the set time period; and a convolution operator calculation unit, configured to calculate the convolution operator of the directed graph at each moment within the set time period according to the convolution operators corresponding to all the orders of the directed graph at each moment within the set time period.

In practical application, the unit for calculating a convolution operator of a directed graph includes:

a subunit for calculating a convolution operator of a directed graph, configured to calculate a convolution operator of the k-hop directed graph at a moment t according to formula $GC_t^k = (W_{gc\_k} \odot \tilde{A}^k \odot FFR)$, where $GC_t^k$ represents a convolution operator of the k-hop directed graph at the moment t, $W_{gc\_k}$ represents a weight matrix of a k-hop neighborhood matrix, $\tilde{A}^k$ represents a k-hop neighborhood matrix, FFR represents the free-flow reachability matrix and $X_t$ represents the traffic state of the cross-section where each of the detectors is located at the moment t.

Figure 2:
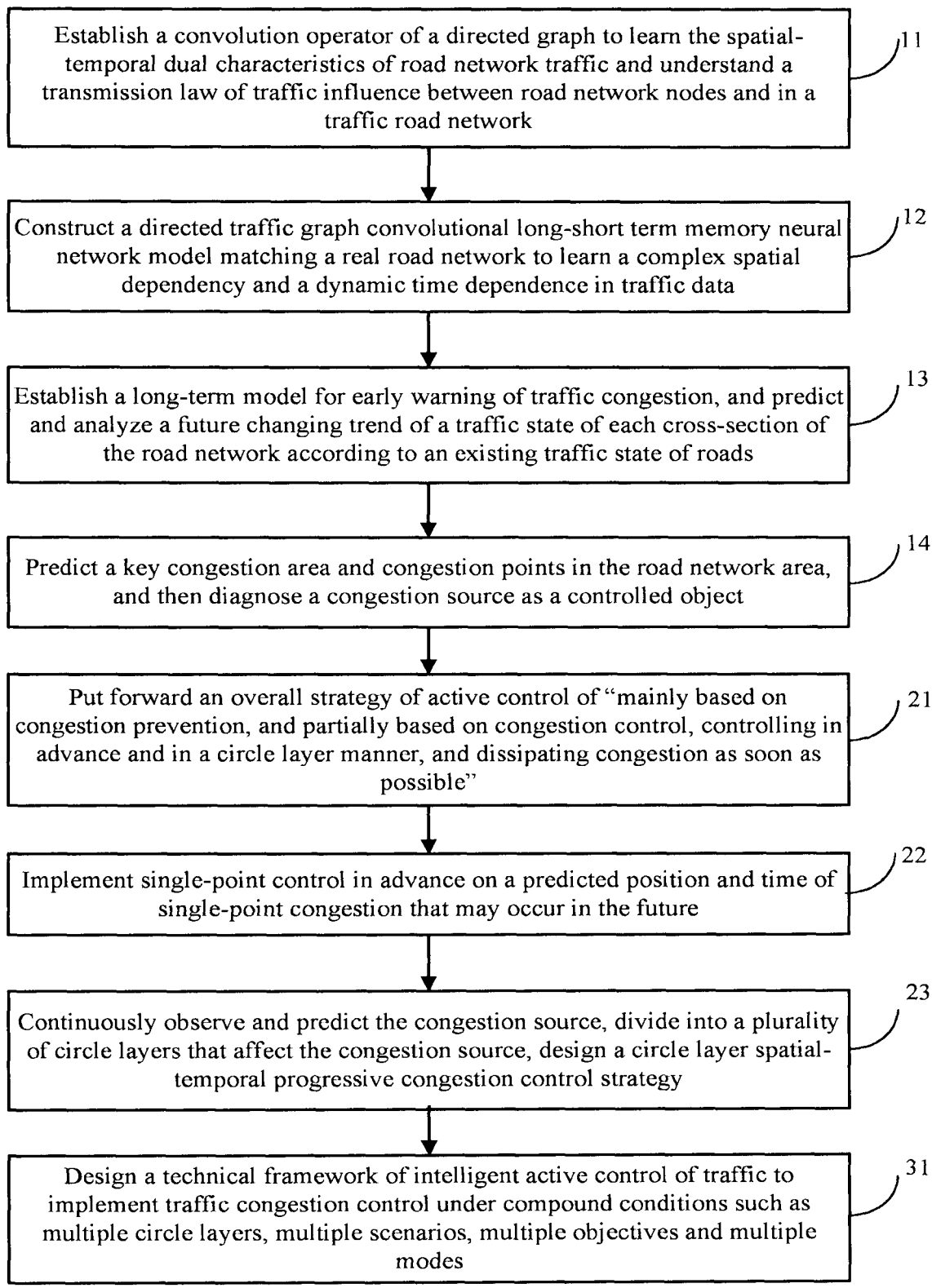
FIG. 2 is a flowchart of a more specific method for active control of road network traffic congestion according to an embodiment of the present disclosure.

As shown in FIG. 2, an embodiment of the present disclosure provides a more specific method for control of urban expressway network traffic congestion based on a directed traffic graph convolutional long short-term memory neural network model, including the following steps.

Step 1): Construct the directed traffic graph convolutional long short-term memory neural network model, to learn the spatial-temporal dual characteristics of road network traffic, implement accurate prediction of future traffic operation of a road network, and complete identification and diagnosis of congestion points in a road network area.

In step 1), the directed traffic graph convolutional long short-term memory neural network model needs to be established, is suitable for the topology of the traffic road network and the spatial-temporal dual characteristics of urban traffic flow, and meets requirements for prediction and identification of congestion points, and this step specifically includes the following steps.

11): Establish a convolution operator $GC_t^{\{K\}}$ of a directed graph to learn the spatial-temporal dual characteristics of road network traffic and understand a transmission law of traffic influence between road network nodes and in a traffic road network.

111): Define a directed graph ($\mathcal{G}\cdot\mathcal{V}, \mathcal{E}, A$) to represent a relationship between a traffic road network and detectors on the road network.

v represents a node (a cross-section where each detector is located) of the graph, there are a total of N nodes, and detectors are arranged on the same cross-section of the same road section in two directions respectively; $\mathcal{E}$ represents an edge (road section) of each connection node of the graph; and $A \in R^{N \times N}$ is a one-hop neighborhood matrix (i.e., the adjacency matrix) and represents the connectivity between nodes. If there is a road section directly connected between two detectors i and j, and there are no other detectors on the connected road section, in the matrix, element $A_{i,j}=1$, or else $A_{i,j}=0$ ($A_{i,i}=0$).

112): Define a shortest distance matrix $D \in R^{N \times N}$, where each element $D_{i,j}$ in the matrix represents a shortest path distance ($D_{i,i}=0$) between nodes i and j.

113): Define a graph signal (traffic state) of the node at time t as $X_t \in R^N$.

114) Define a $k^{th}$-order neighborhood matrix $\tilde{A}^k \in R^{N \times N}$. If the detector i reaches the detector j after passing across less than or equal to k road sections, in the matrix, element $\tilde{A}_{i,j}^k=1$, otherwise $\tilde{A}_{i,j}^k=0$ ($\tilde{A}_{i,i}^k=1$). $\tilde{A}_{i,j}^k$ and $\tilde{A}_{j,i}^k$ are not necessarily equal in the directed graph.

The $k^{th}$-order neighborhood matrix is calculated according to formula $\tilde{A}^k = I + \Sigma_{m=1}^{m=k}(\tilde{A}^1)^m$, is a unit matrix, A is a first-order neighborhood matrix, and m represents the m power of the matrix A.

115): Define a free-flow reachability matrix $FFR \in R^{N \times N}$. FFR is calculated according to formula $$FFR_{i,j} \begin{cases} 1, & S_{i,j}^{FF} n\Delta t - D_{i,j} \geq 0 \\ 0, & \text{others} \end{cases}.$$

$S_{i,j}^{FF}$ is a free-flow vehicle speed between nodes i and j, $\Delta t$ is a unit time interval, and n is an integer, and is used to calculate how many time intervals should be considered to calculate a driving distance at the free-flow vehicle speed. If a vehicle can travel from the node i to the node j at the free-flow vehicle speed within a time $n \cdot \Delta t$, element $FFR_{i,j}=1$, otherwise $FFR_{i,j}=0$ ($FFR_{i,i}=0$). $FFR_{i,j}$ and $FFR_{j,i}$ are not necessarily equal.

116) A $k^{th}$-order directed traffic graph convolution operator is calculated according to formula $GC_t^k = (W_{gc\_k} \odot \tilde{A}^k \odot FFR)$.

$W_{gc\_k}$ is a weight matrix of the $k^{th}$-order neighborhood matrix, and $\odot$ represents multiplication of the elements at the corresponding position of the matrix. When k is added, $\tilde{A}^k \odot FFR$ eventually converges, and when k=K, $\tilde{A}^k \odot FFR = FFR$.

117) The $k^{th}$-order directed traffic graph convolution operator is calculated according to $GC_t^{\{K\}} = [GC_t^1, GC_t^2, \ldots, GC_t^K]$, considering the spatial-temporal dual characteristics of road network traffic.

12): Construct a directed traffic graph convolutional long short-term memory neural network model matching a real road network to learn a complex spatial dependency and a dynamic time dependence in traffic data.

121): Four gate structures of the directed traffic graph convolutional long short-term memory neural network model are a forget gate, an input gate, an output gate and an input unit state gate, as shown in formulas (1) to (4):

$$\text{forget gate } f_t = \sigma_g(W_f \cdot GC_t^{\{K\}} + U_f \cdot h_{t-1} + b_f) \quad (1);$$

$$\text{input gate } i_t = \sigma_g(W_i \cdot GC_t^{\{K\}} + U_i \cdot h_{t-1} + b_i) \quad (2);$$

$$\text{output gate } o_t = \sigma_g(W_o \cdot GC_t^{\{K\}} + U_o \cdot h_{t-1} + b_o) \quad (3); \text{ and}$$

$$\text{input unit state gate } \tilde{C}_t = \tanh(W_C \cdot GC_t^{\{K\}} + U_C \cdot h_{t-1} + b_C) \quad (4),$$

where $\cdot$ is a matrix multiplication operator. $W_f$, $W_i$, $W_o$ and $W_C \in RK^{N \times N}$ are weight matrices, the input is mapped to three gates and input unit state, and $U_f$, $U_i$, $U_o$ and $U_C \in RK^{N \times N}$ are weight matrices of a previous hidden state. $b_f$, $b_i$, $b_o$ and $b_C \in R^N$ are four deviation vectors. $\sigma_g$ is a gate activation function, and is usually a sigmoid function, and tanh is a hyperbolic tangent function. Prevention should be the first step in the treatment of traffic congestion, that is, a changing trend of a traffic state in a short time can be predicted and analyzed according to an existing traffic state of a road, and early warning is performed against a congestion phenomenon that may occur. If measures are taken after the congestion appears, the deterioration of the traffic state of the entire road network makes it difficult to return to a relatively smooth state. The time and place when and where congestion occurs are predicted in advance, a response is performed, so that congestion is prevented before it occurs, and measures are taken actively to prevent congestion. In recent years, with the development of big data of traffic and the higher requirements of traffic control departments for the timeliness and accuracy of traffic prediction, artificial intelligence algorithms represented by neural network models are gradually developed, and are widely used in the field of nonlinear traffic flow prediction, which achieves better prediction results than conventional parametric models. However, due to the spatial-temporal dual characteristics of road traffic, the accuracy or interpretability of a general neural network model during use in traffic prediction is insufficient. A novel neural network model more suitable for road traffic needs to be explored for traffic prediction to provide a basis for subsequent traffic control. The directed traffic graph convolutional long short-term memory neural network model according to this embodiment is used to improve the accuracy or interpretability of traffic prediction.

122) Considering the mutual influence between nodes, according to the present disclosure, an adjacent node state influence gate is designed and added, and is calculated according to formula $\tilde{C}_{t-1}^* = W_N \odot (\tilde{A}^k \odot FFR) \cdot C_{t-1}$.

$W_N$ is a weight matrix, and is used to measure the contribution of states of adjacent nodes, $C_{t-1} \in R^{N \times 1}$ is long-term memory preserved at a moment t−1, that is, a historical traffic state of the entire road network, and a historical traffic state $C_{t-1}^* \in R^{N \times 1}$ at a moment t−1 considering the interaction between cross-sections is calculated.

123): Calculate Updated long-term memory $C_t \in R^{N \times 1}$ and an outputted traffic state $h_t \in R^{N \times 1}$ at the moment t according to formulas $C_t = f_t \odot C_{t-1}^* + i_t \odot \tilde{C}_t$ and $h_t = o_t \odot \tanh(C_t)$, respectively. $o_t$ is a gate activation function, and is usually a sigmoid function.

13): Establish a long-term model for early warning of traffic congestion, and predict and analyze a future changing trend of a traffic state of a cross-section where each detector of the road network is located according to an existing traffic state of roads. The constructed directed traffic graph convolutional long short-term memory neural network model is trained to obtain a long-term model for early warning of traffic congestion, and early warning is performed against a congestion phenomenon that may occur, that is, the $k^{th}$-order directed traffic graph convolution operator is inputted into the directed traffic graph convolutional long short-term memory neural network model constructed in step 12) to obtain a traffic state of a cross-section where each detector is located at each moment in the predicted time period.

14): Predict a key congestion area and congestion points in the road network area, and then diagnose a congestion source as a controlled object. Prediction is performed according to the two characteristics that congestion points are congested at an earlier time and can affect a relatively large range around, specifically: A speed transition point of the congestion source is found according to historical measured data. The time when a speed in a predicted speed sequence of the congestion source is less than a characteristic speed for the first time is found, and a target time period for implementing congestion control in the present disclosure is from the last 5 minutes of this time to the time when the speed does not continue to decrease and rises again.

2): Put forward an overall strategy for active control of urban traffic congestion, and based on traffic prediction results, use strategies to control single-point congestion that may occur and mild congestion at congestion points in the future, respectively.

Figure 5:
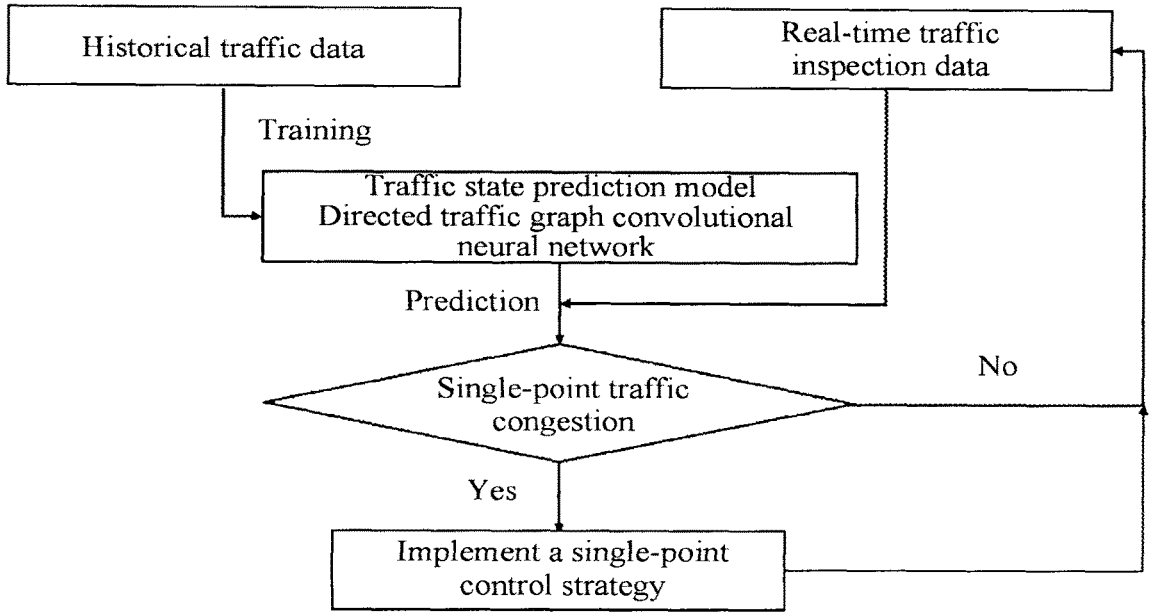
FIG. 5 is a flowchart of single-point control according to the present disclosure.
Figure 6:
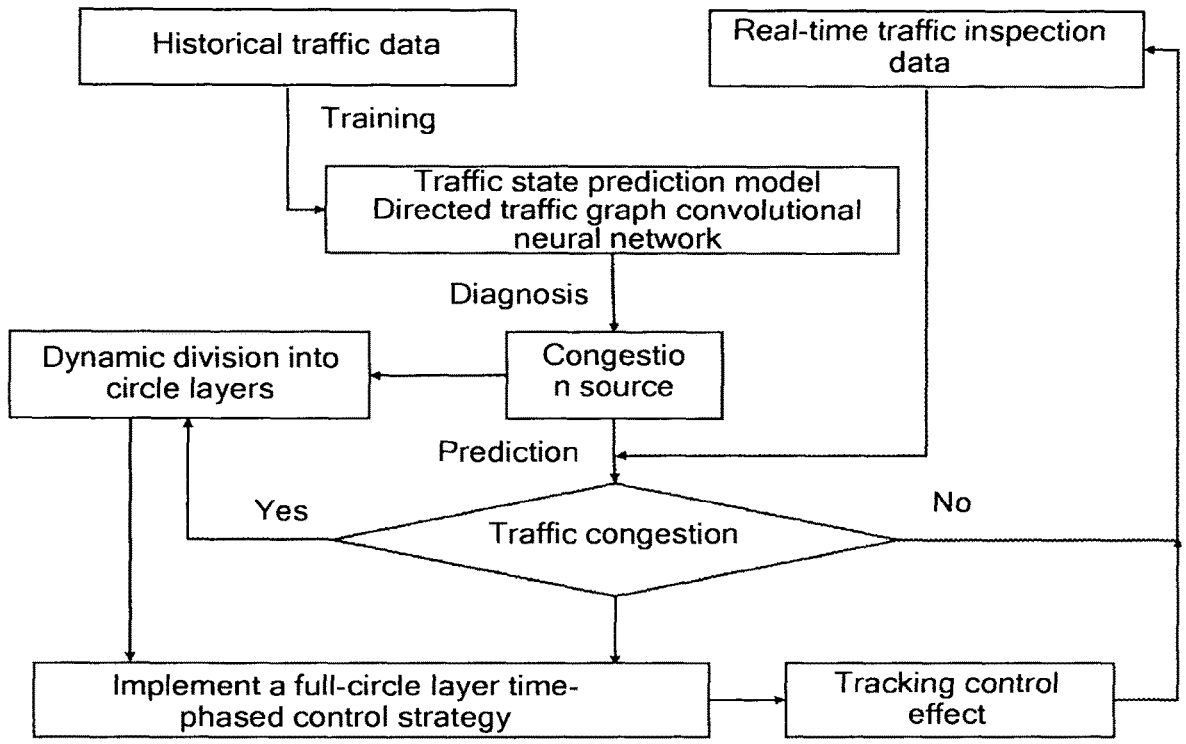
FIG. 6 is a flowchart of a circle layer spatial-temporal progressive congestion control strategy according to the present disclosure.

In step 2), single-point control needs to be performed on single-point occasional congestion according to the traffic prediction results. As shown in FIG. 5, a circle layer spatial-temporal progressive congestion control strategy is used, so that as shown in FIG. 6, the duration of congestion is shortened, dense traffic is evacuated in a timely manner, the dissipation of congestion is accelerated, the spread of congestion in time and space is avoided, and the rapid relief of area congestion is implemented. This step specifically includes the following steps.

21): Put forward an overall strategy of active control of "mainly based on congestion prevention, partially based on congestion control, controlling in advance and in a circle layer manner, and dissipating congestion as soon as possible".

22): Implement single-point control in advance on a predicted position and time of single-point congestion that may occur in the future. The directed traffic graph convolutional long short-term memory neural network model according to the present disclosure is used to predict real-time traffic inspection data to obtain a position and time of single-point congestion that may occur in the future, and single-point control is implemented on the position and time in advance, to avoid congestion.

23): Continuously observe and predict the congestion source, divided it into a plurality of circle layers that affect the congestion source, and when it is predicted that the congestion source may be slightly congested in a certain time period in the future, use a circle layer spatial-temporal progressive congestion control strategy.

The circle layer spatial-temporal progressive congestion control strategy is to control a plurality of circle layers in different time periods, and the control focuses on different circle layers in different time periods. The traffic flow input through an on-ramp is restricted more strictly from an outer circle layer which is far away from the congestion source, and control measures weakening in a stepped manner are used in the middle and inner circle layers. Then, as the time approaches the time when the congestion source is congested, the key control is gradually shifted to the middle circle layer and the inner circle layer.

According to the present disclosure, the following two indexes are put forward to measure the control effect: $E_{contro} = \Sigma_1^P (S_{after\ t_{aim\_i}} - S_{before\ t_{aim\_i}})$ and $\Delta t = t_{after} - t_{aim}$.

$t_{aim}$ represents first congestion duration, and may be divided into p analysis steps when 5 min is taken as one analysis step, and $t_{aim} = 5 \times p$. $t_{after}$ represents second congestion duration, $S_{after\ t_{aim\_l}}$ represents a speed in the $1^{st}$ analysis step in a time period $t_{aim}$ after control, and $S_{before\ t_{aim\_l}}$ represents a speed in the $1^{st}$ analysis step in the time period $t_{aim}$ before control. Specifically, when the vehicle speed within the first congestion duration after control returns to the vehicle speed within the first congestion duration before control or the vehicle speed within the first congestion duration after control returns to the vehicle speed corresponding to the speed transition point or above, circle layer control is stopped.

3): Establish a technical framework of intelligent active control of traffic based on a control strategy.

In step 3), the technical framework of intelligent active control of traffic is designed to implement traffic congestion control under compound conditions such as multiple circle layers, multiple scenarios, multiple objectives and multiple modes. The overall framework is mainly divided into two parts: a traffic command center and a drive test controller.

The embodiment of the present disclosure has the following technical effects:

According to the embodiment of the present disclosure, the strategy and method for control of urban road network traffic congestion based on a directed traffic graph convolutional long short-term memory neural network model are established, so as to predict the traffic state of the road network efficiently and accurately, actively take measures to prevent congestion, and curb the spread of congestion. The control scheme and strategy and technical framework are clear and highly systematic.

According to embodiments of the present disclosure, the above embodiment is applied to Puxi part within Shanghai Outer Ring Road, and the following steps are specifically provided.

Step 1: Construct a traffic graph convolution operator to reflect a transmission law of traffic influence between road network nodes and in a traffic road network.

Figure 3:
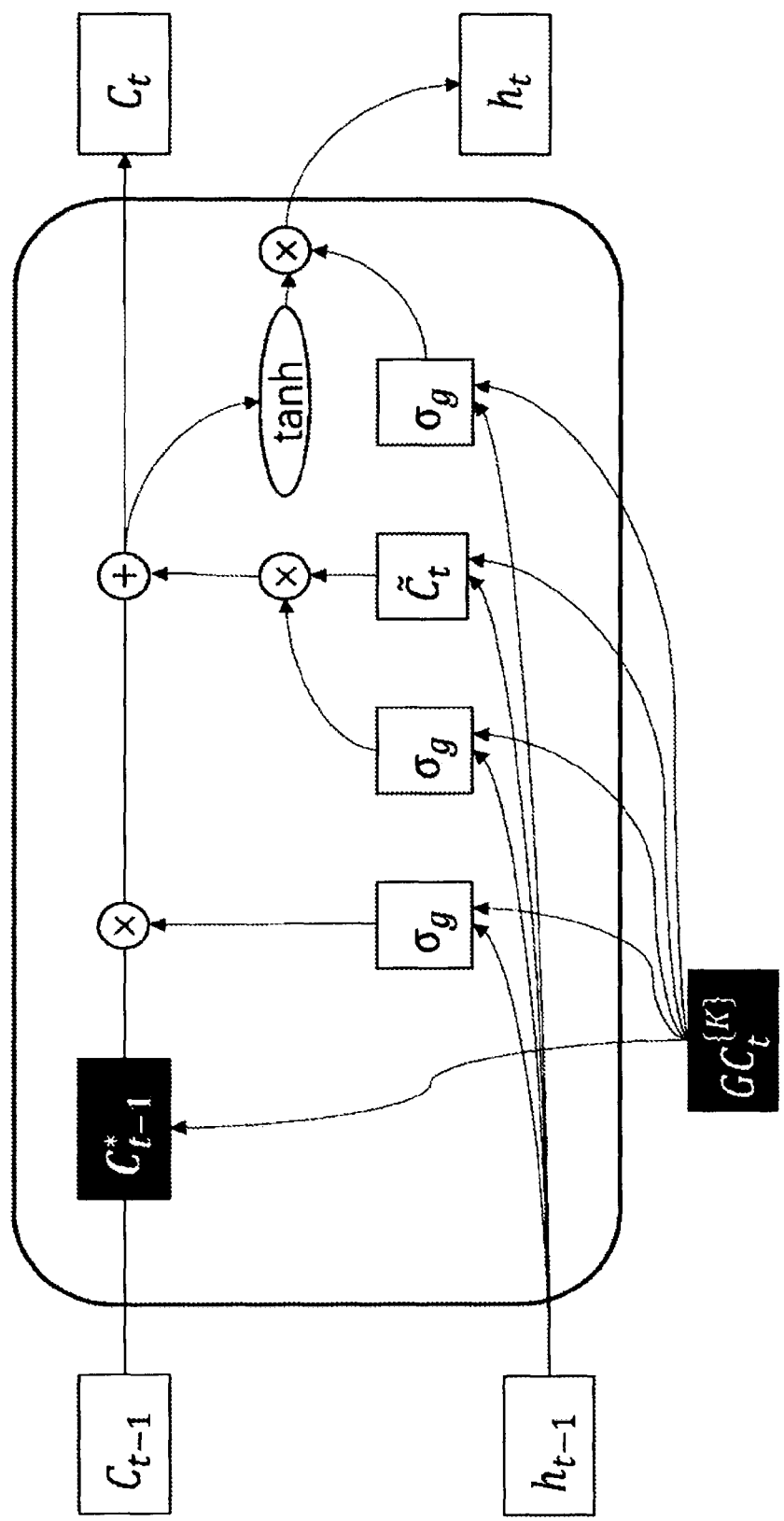
FIG. 3 is a structural diagram of a directed traffic graph convolutional long short-term memory neural network model according to the present disclosure.

Step 2: Apply $K^{th}$-order directed traffic graph convolution to a long short-term memory neural network model, and construct a directed traffic graph convolutional long short-term memory neural network model. The model structure is shown in FIG. 3.

Step 3: Predict and analyze a future changing trend of a traffic state by using the directed traffic graph convolutional constructed long short-term memory neural network model.

Historical data used for model training in the embodiment of the present disclosure came from traffic data collected on working days by all main line and ramp detectors on the expressway in Puxi part within the Shanghai Outer Ring Road (excluding the Outer Ring). The detectors record information such as flow, driving speed and occupancy rate on a lane of each inspection cross-section once every 5 minutes.

In order to facilitate the implementation of the follow-up control strategy, the speed on a mainline and the flow on the ramp are selected as input data for prediction. A speed sequence on the main line and a flow sequence on the ramp are predicted.

Step 4: Predict congestion points and a congestion spatial-temporal range of a road network area according to the two characteristics that congestion points are congested at an earlier time and can affect a relatively large range around, and then diagnose a congestion source as a controlled object.

Figure 4:
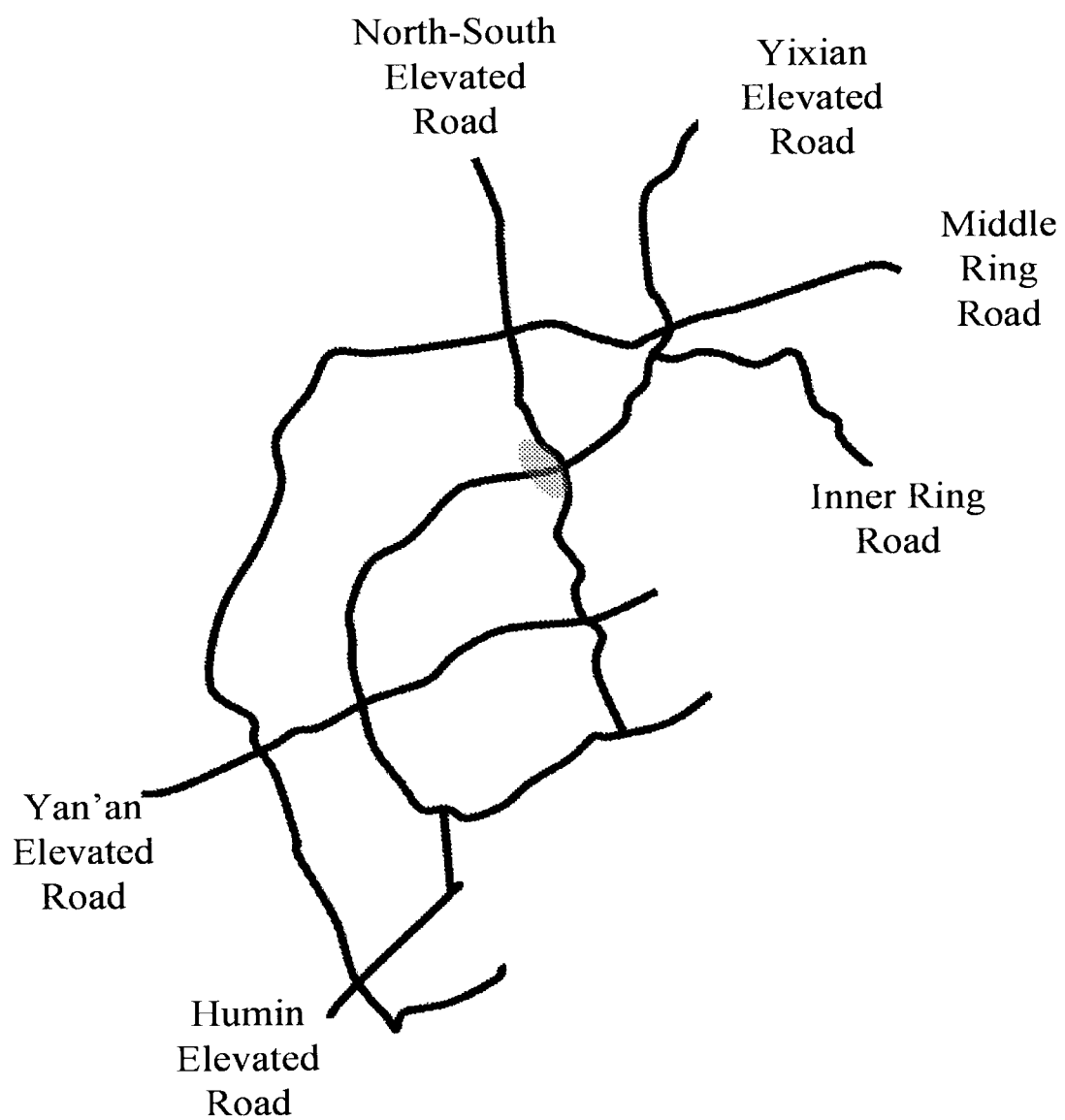
FIG. 4 is a schematic diagram of the location of a congestion space-time range identified according to an example of the present disclosure.

In this example, key congestion areas in Puxi part of the Shanghai Outer Ring Road are in the inspection cross-sections NBXX19-NBXX23, which are located in a road section from the west side of the North-South Elevated Road to Gonghe New Road overpass, and the approximate position on the map is shown in FIG. 4. The inspection cross-section NBXX22 is a point where congestion most often occurs, and it is determined that this cross-section is a congestion source in this area. Some results of speed prediction of the congestion source are shown in Table 1.

TABLE 1

Some results of speed prediction of the congestion source

| No. | Time | Speed (km/h) at NBXX22 |
|---|---|---|
| 1 | 5:55-6:00 | 65.859 |
| 2 | 6:00-6:05 | 65.960 |
| 3 | 6:05-6:10 | 62.604 |
| 4 | 6:10-6:15 | 58.650 |
| 5 | 6:15-6:20 | 54.121 |
| 6 | 6:20-6:25 | 47.172 |
| 7 | 6:25-6:30 | 35.813 |
| 8 | 6:30-6:35 | 28.605 |
| 9 | 6:35-6:40 | 20.493 |
| 10 | 6:40-6:45 | 17.576 |
| 11 | 6:45-6:50 | 15.961 |
| 12 | 6:50-6:55 | 20.082 |
| 13 | 6:55-7:00 | 32.493 |
| 14 | 7:00-7:05 | 34.753 |
| 15 | 7:05-7:10 | 41.120 |

The speed transition of the congestion source NBXX22 in the example was about 43 km/h. Before congestion occurs, measures should be taken to control an on-ramp in advance before the speed exceeds the speed transition point, the flow of the on-ramp is adjusted, and the traffic demand on the main line is reduced, so that speed transition does not occur.

According to the predicted speed sequence of the congestion source, a target time period for implementing congestion control was 30 minutes from 6:20 to 6:50.

Step 5: Implement single-point control measures in advance for a predicted position on the main line where occasional single-point congestion may occur, to avoid congestion at the position. The flow of single-point control is shown in FIG. 5.

Step 6: Continuously observe and predict the congestion source, and divide it into a plurality of circle layers that affect the congestion source. Herein, the division was performed into three circle layers: An inner circle layer was in the range of driving for 10 minutes at the speed corresponding to the speed transition point with the congestion source as the center; a middle circle layer was in the range of driving for 10 to 20 minutes at the speed corresponding to the speed transition point with the congestion source as the center; and an outer circle layer was in a range of driving for 20 to 30 minutes at the speed corresponding to the speed transition point with the congestion source as the center. The inner circle layer, the middle circle layer and the outer circle layer of the congestion source NBXX22 in the example included 25, 57 and 24 on-ramp inspection cross-sections respectively.

Figure 7:
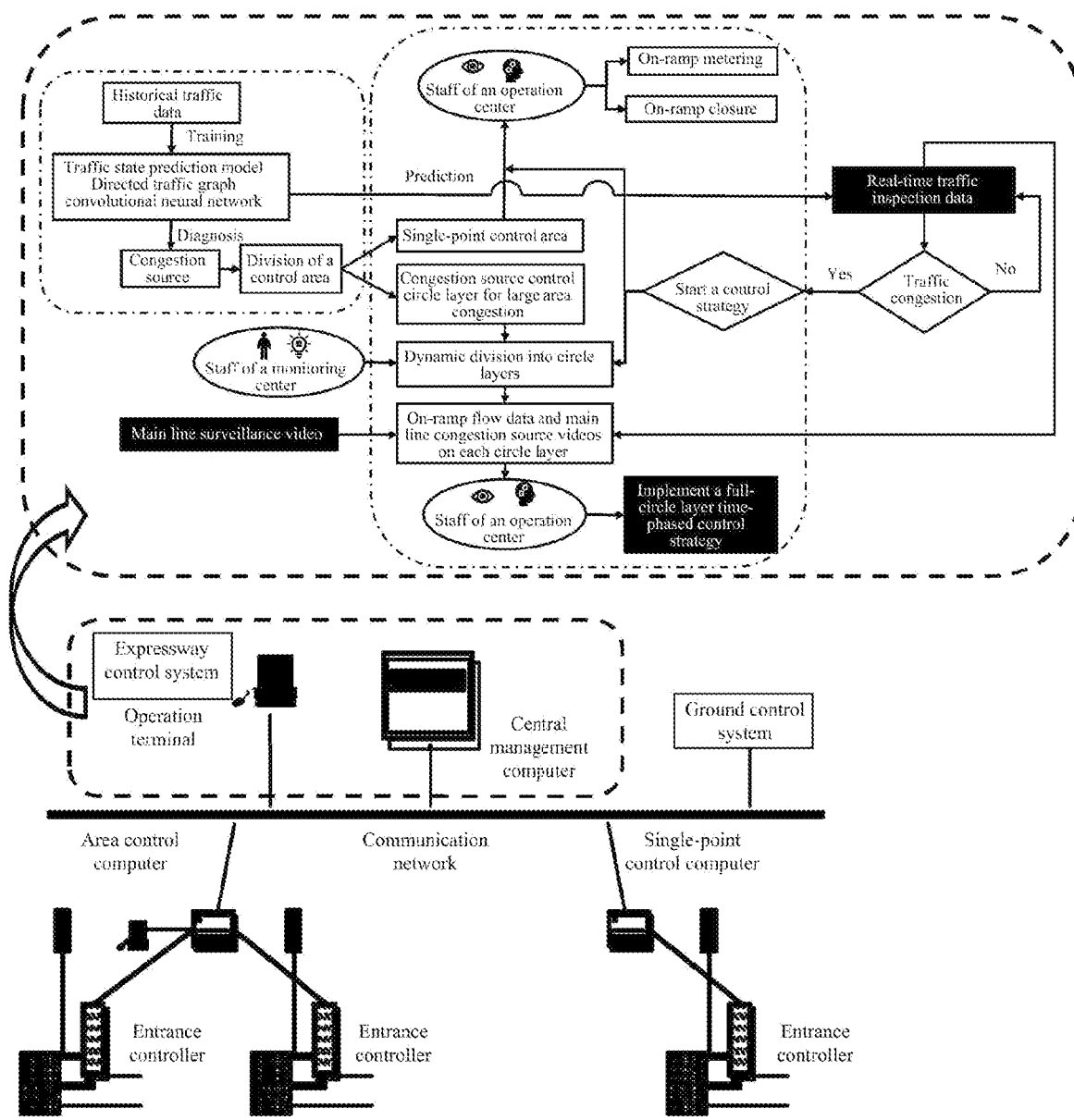
FIG. 7 is a schematic diagram of an overall technical framework of intelligent active control of road network traffic according to the present disclosure.

The present disclosure designs a circle layer spatial-temporal progressive congestion control strategy, and the flow is shown in FIG. 7. The control level was set to 0.25%, 0.5%, 1%, 2%, 5% and 10%. The first step was to strictly control the outer circle layer, moderately control the middle circle layer and slightly control the inner circle layer, the second step was to strictly control the middle circle layer, moderately control the inner circle layer, and implement gradual backflow of the outer circle layer, and the third step was to strictly control the inner circle layer and implement gradual backflow of the outer circle layer and the middle circle layer. The control effects under different flow control levels are shown in Table 2.

TABLE 2

Effect sequencing of circle layer spatial-temporal progressive congestion control strategies

| Scheme No. | Control scheme | Control effect index value $E_{control}$ | Control effect index value $\Delta t$ |
|---|---|---|---|
| 1 | 10%, 3%, 1% | 14.477 | −10 min |
| 2 | 5%, 3%, 1% | 14.394 | −10 min |
| 3 | 3%, 2%, 1% | 14.361 | −10 min |
| 4 | 2%, 1%, 0.5% | 14.344 | −10 min |
| 5 | 1.5%, 1%, 0.5% | 14.336 | −10 min |
| 6 | 1%, 0.5%, 0.25% | 14.328 | −10 min |

It can be seen from Table 2 that the circle layer spatial-temporal progressive congestion control strategies can achieve a better control effect at a relatively small cost, and is suitable for the active control of expressway traffic congestion.

Compared with the prior art, the present disclosure has the following advantages:

The present disclosure relates to a method and system for active control of road network traffic congestion based on a directed traffic graph convolutional long short-term memory neural network model. The method includes the following steps. 1): Construct a directed traffic graph convolutional long short-term memory neural network model, to implement the accurate prediction of future traffic operation, and complete the identification and diagnosis of congestion points. 2): For the congestion points, dynamically divide into a plurality of circle layers of congestion control, and design a circle layer spatial-temporal progressive congestion control strategy to avoid the spread of congestion in time and space and shorten the duration of congestion. 3): Put forward a method for establishing a system for active circle layer spatial-temporal progressive control.

According to the present disclosure, the traffic state of the road network can be efficiently and accurately predicted, a congestion spatial-temporal area and congestion points can be comprehensively and accurately identified and diagnosed, the congestion time is effectively shortened, the spread of congestion is curbed targetedly, object control and control means are implemented in a circle layer manner completely and targetedly, and a control scheme strategy and a technical framework are clear and highly systematic. The method and system have the advantages such as originality, scientificity and practicality.

1. Originality: Currently, there is an urgent need in China to establish strategies and methods for urban road network traffic congestion control with diversified control means and obvious control effects. However, existing traffic congestion control ignores increasingly spatial-temporal complexity characteristics of traffic congestion, and the current traffic congestion control still needs to be optimized. According to the present disclosure, considering the spatial-temporal correlativity of traffic congestion, a strategy and method for traffic congestion control of an urban expressway network based on a directed traffic graph convolutional long short-term memory neural network model is established, which can effectively empower the research and construction of the traffic congestion control framework in China.

2. Scientifically: The strategy and method for traffic congestion control of an urban expressway network based on a directed traffic graph convolutional long short-term memory neural network model according to the present disclosure can meet requirements of traffic prediction, an object (congestion source), opportunity and countermeasures under traffic congestion tracking control can be more actively and scientifically selected, a scientific and effective circle layer spatial-temporal progressive congestion control strategy is implemented, and timely response and treatment of current congestion problems and preventive improvement of potential congestion problems can be implemented.

3. Practicality: The strategy and method for traffic congestion control of an urban expressway network based on a directed traffic graph convolutional long short-term memory neural network model according to the present disclosure is a systematic process and can track traffic flow data on the road network for a long time, evaluate the spatial-temporal influence range of congestion and complete the diagnosis of the congestion source, and can implement a timely response and treatment of current congestion problems and preventive improvement of potential congestion problems. According to the present disclosure, the method has a wide range of applicability in road network traffic congestion area identification and congestion control.

Figure 8:
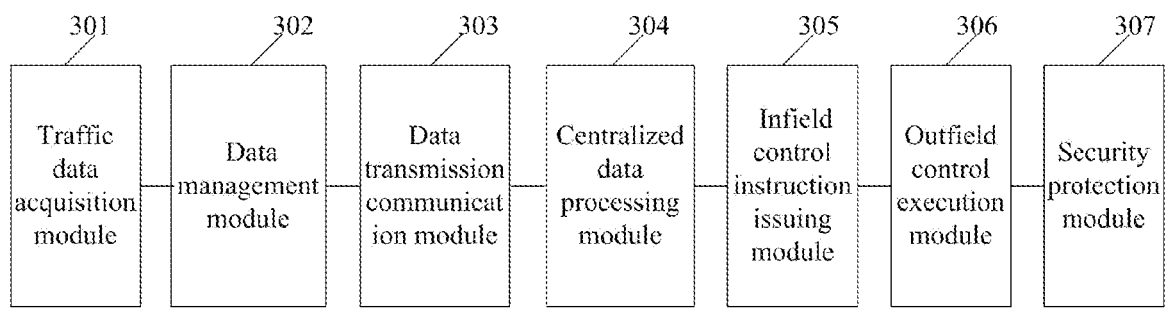
FIG. 8 is a module diagram of a control technical framework according to the present disclosure.

As shown in FIG. 8, in view of the above method, the present disclosure further designs an overall technical framework of intelligent active control of traffic, which is divided into two levels:

An upper layer is based on historical traffic data, the long short-term memory neural network model constructed according to the present disclosure is used for training and diagnosis of a congestion source, and then two types of control areas are obtained by division, where one is a single-point congestion control area, and the other is a congestion source control circle layer for large-area congestion.

Lower layers respectively implement their control strategies. The existing single-point control workflow and technical method are continued in the single-point control area; a new workflow and technical method are used for the congestion source control circle layer. Once measured traffic data is used to predict that the congestion source will be congested in a future time period, the control strategy is started, staff of a monitoring center complete dynamic area division, and staff of an operation center are automatically assigned ramp and mainline section videos that need to note, and operators dynamically implement the circle layer spatial-temporal progressive congestion control strategy according to the ramp flow data collected in this case and the situation observed from the main line videos.

As shown in FIG. 8, a technical framework of intelligent active control of traffic according to the present disclosure includes the following modules.

Module 301: traffic data acquisition module, including:
traffic information detection facilities (detectors arranged on a road), video monitoring facilities, traffic information guidance facilities, high-definition speed measurement facilities, access monitoring facilities, jaywalking capture facilities, and the like that collect original data. A front-end information acquisition device in this project is mainly an annular detection coil arranged on the road surface.

Module 302: data management module, including:
traffic information analysis software, a data processing server, a video storage server (or a disk array) and a client, mainly configured to convert original data obtained by a front-end acquisition device into reports and graphical interfaces for analysis by a user, and store and query historical data.

Module 303: data transmission communication module, including:
an optical fiber physical link and an optical fiber transceiver. The module is mainly configured to complete the rapid upload of long-distance information and rapid issuing of control information. It may be considered to transmit mainly employing a point-to-point optical fiber network. During transmission design, reliability, expansibility, and development are fully considered, and the reuse of a transmission device with a traffic signal control system, a traffic electronic police system, etc. is considered, to maximize the port reuse of the transmission device.

Module 304: centralized data processing module, configured to ensure the data processing ability while continuously receiving massive data, and use a directed traffic graph convolutional long short-term memory neural network model with high prediction accuracy and good real-time performance to ensure the ability to rapidly process real-time updated data and the ability to provide a prediction for the traffic state of the road network. In addition, it is further required to regularly analyze and process existing massive historical data, update the trained model on time, ensure prediction accuracy, and update congestion control measures in a timely manner to truly implement active control.

Module 305: infield control instruction issuing module:
this module has a complex structure, a large amount of data, and a large number of users, which requires the ability to automatically monitor, report and diagnose a network state, data processing speed, etc. An administrator can quickly discover problems through simple operations, take measures and issue an instruction to actively control congestion. Infield staff falls into two parts. One part of the staff monitor and control a certain area conventionally, and can quickly perform a response after single-point congestion occurs, and the other part of the staff monitor and dynamically control key road nodes, and further need to track a control effect to dynamically adjust the control strategy.

Module 306: outfield control execution module:
under the same timing accuracy, the synchronous control of multiple circle layers and multiple ramps is implemented, and instructions issued by the infield control instruction issuing module are executed accurately and quickly.

Module 307: security protection module:

the technical framework faces both internal and external security threats. The internal threats refer to the impact of the continuous operation of the module on a storage device, a communication link, etc., while the external threats refer to malicious attacks that affect the normal operation of the module. Therefore, the module is required to have the ability to protect against internal threats and external threats and regularly check security vulnerabilities.

Embodiments of the description are described progressively, each embodiment focuses on the difference from other embodiments, and for the same and similar parts between the embodiments, reference may be made to each other. Since the system disclosed in one example corresponds to the method disclosed in another example, the description is relatively simple, and reference can be made to the method description.

Specific examples are used herein to explain the principles and implementations of the present disclosure. The foregoing description of the above embodiments is merely intended to help understand the method of the present disclosure and its core ideas; besides, various modifications may be made by those of ordinary skill in the art to specific implementations and the scope of application in accordance with the ideas of the present disclosure. In conclusion, the content of the description shall not be construed as a limitation to the present disclosure.

What is claimed is:

1. A method for controlling road network traffic congestion, comprising:

acquiring, by traffic information detection facilities, positions of detectors in a road network and a traffic state of a cross-section where each of the detectors is located at each moment within a set time period, wherein the traffic state comprises a vehicle speed and traffic flow;

constructing, by a computer, a directed graph according to the positions of the detectors in the road network, wherein nodes in the directed graph are cross-sections where the detectors are located in the road network, and edges in the directed graph are road sections between the cross-sections where the detectors are located;

determining, by the computer, a free-flow reachability matrix of the directed graph and a plurality of neighborhood matrices with different orders according to a free-flow vehicle speed between the cross-sections where the detectors are located and the directed graph, wherein when the order is k, the neighborhood matrices indicate whether a vehicle reaches $j^{th}$ detector from an $i^{th}$ detector after passing across k road sections, and the free-flow reachability matrix indicates whether the vehicle reaches the $j^{th}$ detector from the $i^{th}$ detector at the free-flow vehicle speed within a set time;

calculating, by the computer, a convolution operator of the directed graph at each moment within the set time period according to the neighborhood matrices of all the orders, the free-flow reachability matrix and the traffic state of the cross-section where each of the detectors is located at each moment within the set time period;

constructing, by the computer, a long short-term memory neural network model, based on historical traffic data of the road network, to learn spatial-temporal characteristics of the road network;

inputting the convolution operator of the directed graph at each moment within the set time period into the long short-term memory neural network model to obtain a traffic state of a cross-section where each of the detectors is located at each moment in a predicted time period;

determining, according to the traffic state of the cross-section where each of the detectors is located at each moment within the set time period and the traffic state of the cross-section where the detector is located at each moment in the predicted time period, whether the cross-section where the detector is located is a congestion source or single-point congestion;

controlling, when the cross-section where the detector is located is single-point congestion, the traffic flow of the cross-section by using a control method for single-point control; and controlling, when the cross-section where the detector is located is a congestion source, the cross-section where the detector is located by using a control method for circle layer control, and determining, in real-time, whether to stop circle layer control according to first congestion duration, second congestion duration, a vehicle speed within the first congestion duration before control and a vehicle speed within the first congestion duration after the control, wherein the first congestion duration is congestion duration before control; and the second congestion duration is congestion duration after the control: wherein the circle layer control is to control, according to a distance between the cross-section where the detector is located and a congestion source, the traffic flow of the cross-section where the detector is located.

2. The method for controlling road network traffic congestion according to claim 1, wherein determining the free-flow reachability matrix of the directed graph and the plurality of neighborhood matrices with different orders according to the free-flow vehicle speed between the cross-sections where the detectors are located and the directed graph comprises:

determining a shortest distance matrix of the directed graph and the plurality of neighborhood matrices with different orders according to the directed graph; and calculating the free-flow reachability matrix according to the shortest distance matrix of the directed graph and the free-flow vehicle speed between the cross-sections where the detectors are located.

3. The method for controlling road network traffic congestion according to claim 1, wherein calculating the convolution operator of the directed graph at each moment within the set time period according to the neighborhood matrices of all the orders, the free-flow reachability matrix and the traffic state of the cross-section where each of the detectors is located at each moment within the set time period comprises:

calculating, for any order, a convolution operator of the directed graph corresponding to the order at each moment within the set time period according to the neighborhood matrices of the order, the free-flow reachability matrix and the traffic state of the cross-section where each of the detectors is located at each moment within the set time period; and calculating the convolution operator of the directed graph at each moment within the set time period according to the convolution operators corresponding to all the orders of the directed graph at each moment within the set time period.

4. The method for controlling road network traffic congestion according to claim 3, wherein calculating the convolution operator of the directed graph corresponding to the order at each moment within the set time period according to the neighborhood matrices of the order, the free-flow reachability matrix and the traffic state of the cross-section where each of the detectors is located at each moment within the set time period comprises:

calculating a convolution operator of the k-hop directed graph at a moment t according to formula $GC_t^k = (W_{gc\_k} \odot \tilde{A}^k \odot FFR)$, wherein $GC_t^k$ represents a convolution operator of the k-hop directed graph at the moment t $W_{gc\_k}$ represents a weight matrix of a k-hop neighborhood matrix, $\tilde{A}^k$ represents a k-hop neighborhood matrix, FFR represents the free-flow reachability matrix and $X_t$ represents the traffic state of the cross-section where each of the detectors is located at the moment t.

5. A system for controlling road network traffic congestion, comprising: a computer and traffic information detection facilities;

wherein the traffic information detection facilities are configured to acquire positions of detectors in a road network and a traffic state of a cross-section where each of the detectors is located at each moment within a set time period, wherein the traffic state comprises a vehicle speed and traffic flow; and the computer is configured to:
construct a directed graph according to the positions of the detectors in the road network, wherein nodes in the directed graph are cross-sections where the detectors are located in the road network, and edges in the directed graph are road sections between the cross-sections where the detectors are located;

determine a free-flow reachability matrix of the directed graph and a plurality of neighborhood matrices with different orders according to a free-flow vehicle speed between the cross-sections where the detectors are located and the directed graph, wherein when the order is k, the neighborhood matrices indicate whether a vehicle reaches a $j^{th}$ detector from an $i^{th}$ detector after passing across k road sections, and the free-flow reachability matrix indicates whether the vehicle reaches the $j^{th}$ detector from the $i^{th}$ detector at the free-flow vehicle speed within a set time;

calculate a convolution operator of the directed graph at each moment within the set time period according to the neighborhood matrices of all the orders, the free-flow reachability matrix and the traffic state of the cross-section where each of the detectors is located at each moment within the set time period;

construct a long short-term memory neural network model, based on historical traffic data of the road network, to learn spatial-temporal characteristics of the road network;

input the convolution operator of the directed graph at each moment within the set time period into the long short-term memory neural network model to obtain a traffic state of a cross-section where each of the detectors is located at each moment in a predicted time period;

determine, according to the traffic state of the cross-section where each of the detectors is located at each moment within the set time period and the traffic state of the cross-section where the detector is located at each moment in the predicted time period, whether the cross-section where the detector is located is a congestion source or single-point congestion;

control, when the cross-section where the detector is located is single-point congestion, the traffic flow of the cross-section by using a control method for single-point control; and control, when the cross-section where the detector is located is a congestion source, the cross-section where the detector is located by using a control method for circle layer control, and determine, in real-time, whether to stop circle layer control according to first congestion duration, second congestion duration, a vehicle speed within the first congestion duration before control and a vehicle speed within the first congestion duration after the control, wherein the first congestion duration is congestion duration before control; and the second congestion duration is congestion duration after the control;

wherein the circle layer control is to control, according to a distance between the cross-section where the detector is located and a congestion source, the traffic flow of the cross-section where the detector is located.

6. The system for controlling road network traffic congestion according to claim 5, wherein determining the free-flow reachability matrix of the directed graph and the plurality of neighborhood matrices with different orders according to the free-flow vehicle speed between the cross-sections where the detectors are located and the directed graph comprises:

determining a shortest distance matrix of the directed graph and the plurality of neighborhood matrices with different orders according to the directed graph; and calculating the free-flow reachability matrix according to the shortest distance matrix of the directed graph and the free-flow vehicle speed between the cross-sections where the detectors are located.

7. The system for controlling road network traffic congestion according to claim 5, wherein calculating the convolution operator of the directed graph at each moment within the set time period according to the neighborhood matrices of all the orders, the free-flow reachability matrix and the traffic state of the cross-section where each of the detectors is located at each moment within the set time period comprises:

calculating, for any order, a convolution operator of the directed graph corresponding to the order at each moment within the set time period according to the neighborhood matrices of the order, the free-flow reachability matrix and the traffic state of the cross-section where each of the detectors is located at each moment within the set time period; and calculating the convolution operator of the directed graph at each moment within the set time period according to the convolution operators corresponding to all the orders of the directed graph at each moment within the set time period.

8. The system for controlling road network traffic congestion according to claim 7, wherein calculating the convolution operator of the directed graph corresponding to the order at each moment within the set time period according to the neighborhood matrices of the order, the free-flow reachability matrix and the traffic state of the cross-section where each of the detectors is located at each moment within the set time period comprises:

calculating a convolution operator of the k-hop directed graph at a moment t according to formula $GC_t^k = (W_{gc\_k} \odot \tilde{A}^k \odot FFR)$, wherein $GC_t^k$ represents a convolution operator of the k-hop directed graph at the moment t $W_{gc\_k}$ represents a weight matrix of a k-hop neighborhood matrix, $\tilde{A}^k$ represents a k-hop neighborhood matrix, FFR represents the free-flow reachability matrix and $X_t$ represents the traffic state of the cross-section where each of the detectors is located at the moment t.

* * * * *